United States Patent
Jung et al.

(10) Patent No.: US 12,528,396 B2
(45) Date of Patent: Jan. 20, 2026

(54) SWING ARMREST FOR SEAT

(71) Applicants: Hyundai Motor Company, Seoul (KR); Kia Corporation, Seoul (KR)

(72) Inventors: Chan Ho Jung, Gunpo-si (KR); Deok Soo Lim, Hwaseong-si (KR); Jung Sang You, Hwaseong-si (KR); Sang Soo Lee, Hwaseong-si (KR); Sang Hark Lee, Incheon (KR); Mu Young Kim, Osan-si (KR); Sang Do Park, Suwon-si (KR); Ho Suk Jung, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 300 days.

(21) Appl. No.: 18/300,070

(22) Filed: Apr. 13, 2023

(65) Prior Publication Data
US 2024/0149769 A1 May 9, 2024

(30) Foreign Application Priority Data
Nov. 7, 2022 (KR) .................. 10-2022-0146997

(51) Int. Cl.
*B60N 2/75* (2018.01)
(52) U.S. Cl.
CPC ................... *B60N 2/777* (2018.02)
(58) Field of Classification Search
CPC ......... B60N 2/763; B60N 2/777; B60N 2/767
See application file for complete search history.

(56) References Cited

U.S. PATENT DOCUMENTS

| | | | | |
|---|---|---|---|---|
| 4,270,798 A | * | 6/1981 | Harder, Jr. ............. | A47C 7/543 297/411.31 |
| 6,520,587 B2 | * | 2/2003 | Noiseux ................. | A61G 15/12 297/411.39 |
| 7,600,819 B2 | | 10/2009 | Armo et al. | |
| 7,677,654 B2 | | 3/2010 | Enberg et al. | |
| 9,340,129 B2 | | 5/2016 | Roychoudhury | |
| 10,104,972 B2 | | 10/2018 | Cummins | |
| 11,752,912 B1 | * | 9/2023 | Salter ..................... | B60N 3/023 296/1.02 |
| 11,926,421 B2 | * | 3/2024 | Patel ...................... | B60N 2/753 |
| 2011/0031785 A1 | * | 2/2011 | Steenson ................ | A47C 7/543 297/161 |

FOREIGN PATENT DOCUMENTS

| | | | |
|---|---|---|---|
| JP | 6629518 B2 | | 1/2020 |
| KR | 19980024193 U | | 7/1998 |
| KR | 20060034642 A | | 4/2006 |
| KR | 101037272 B1 | | 5/2011 |
| KR | 101368515 B1 | * | 2/2014 |
| KR | 20220016368 A | | 2/2022 |

* cited by examiner

*Primary Examiner* — Philip F Gabler
(74) *Attorney, Agent, or Firm* — Slater Matsil, LLP

(57) ABSTRACT

An embodiment is a swing armrest for a seat, the swing armrest including a fixation bracket fixed to a seatback frame or fixed to a seatback bracket that is fixed to the seatback frame, a rotation bracket rotatably fixed to the fixation bracket by a rotation pin, a return spring configured to elastically support the rotation bracket in a direction in which the rotation bracket rotates with respect to the fixation bracket, a fixing post protruding from the rotation bracket to a side of the seat, and an armrest coupled to the fixing post.

12 Claims, 9 Drawing Sheets

<STANDARD POSITION OF ARMREST>

<AFTER ARMREST IS SWUNG>

<STANDARD POSITION>

<AFTER BEING SWUNG>

SWING ARMREST FOR SEAT

CROSS-REFERENCE TO RELATED APPLICATIONS

This application claims priority to Korean Patent Application No. 10-2022-0146997, filed on Nov. 7, 2022, in the Korean Intellectual Property Office, which application is incorporated herein by reference.

TECHNICAL FIELD

The present invention relates to an armrest for a seat mounted in a vehicle.

BACKGROUND

An armrest is provided on a seat in a vehicle so that a passenger sitting on the seat may comfortably place his or her arm on the armrest.

Recently, demand for a swivel seat to implement a face-to-face mode in a self-driving vehicle or a connected car has increased.

The swivel seat is configured to rotate the direction thereof with respect to a vehicle body. Before the seat is rotated, the armrest is placed far from a vehicle door, so there is no problem. However, when the seat is rotated, the armrest moves closer to the door of the vehicle, so that the gap between the door and the armrest becomes too narrow. Accordingly, when closing the door, a passenger's arm may be caught between the door and the armrest, resulting in injury.

The information disclosed in this background section is only for enhancement of understanding of the general background of the invention, and should not be taken as an acknowledgement or any form of suggestion that this information forms the related art already known to a person skilled in the art.

SUMMARY

Therefore, the present invention has been made in view of the above problems, and it is an object of the present invention to provide a swing armrest for a seat, the armrest being capable of automatically securing a space between the armrest and a door when an object is caught therebetween. The armrest is applied to a swivel seat, etc., and when the door is closed while the swivel seat is rotated and a passenger's arm is caught between the door and the armrest, the armrest secures a space between the door and the armrest so as to prevent injury to the passenger, thereby greatly improving safety and marketability of a vehicle.

In accordance with an aspect of the present invention, the above and other objects can be accomplished by the provision of a swing armrest for a seat, the swing armrest including a fixation bracket fixed to a seatback frame or fixed to a seatback bracket that is fixed to the seatback frame, a rotation bracket rotatably installed on the fixation bracket, and an armrest fixed to the rotation bracket.

The rotation bracket may be rotatably installed on the fixation bracket by a vertical rotation shaft.

The fixation bracket may be provided with a stopper portion configured to restrict rotation of a front side of the rotation bracket, and the fixation bracket and the rotation bracket may be provided therebetween with a return spring configured to elastically support the rotation bracket towards the stopper portion.

The rotation bracket may be provided with a fixing post configured to fix the armrest, and the armrest may be coupled to the fixing post.

The fixing post may have a shape protruding from the rotation bracket, passing through the fixation bracket, and towards a side of the seat.

The fixation bracket may include two rotation support portions configured to rotatably support the rotation bracket at opposite sides of the rotation bracket, respectively, two fixed support portions configured to fix the two rotation support portions to the seatback frame, respectively, and a stopper portion configured to restrict rotation of the rotation bracket while interconnecting the two rotation support portions.

The fixation bracket may further include a stopper fixing portion extending from the stopper portion and fixed to the seatback frame.

In accordance with another aspect of the present invention, there is provided a swing armrest for a seat, the swing armrest including a fixation bracket fixed to a seatback frame or fixed to a seatback bracket that is fixed to the seatback frame, a rotation bracket rotatably fixed to the fixation bracket by a rotation pin, a return spring installed to elastically support the rotation bracket in a direction in which the rotation bracket rotates with respect to the fixation bracket, a fixing post protruding from the rotation bracket to a side of the seat, and an armrest coupled to the fixing post.

The fixation bracket may include two rotation support portions configured to support opposite ends of the rotation pin, respectively, and a stopper portion having a shape interconnecting the two rotation support portions in a state in which the fixing post protrudes from a space between the two rotation support portions so as to restrict a front side of the rotation bracket from rotating outwardly of the seat.

The fixation bracket may further include two fixed support portions each extending from a corresponding one of the two rotation support portions and fixed to the seatback frame, and a stopper fixing portion extending from the stopper portion and fixed to the seatback frame.

The return spring may be installed between the fixation bracket and the rotation bracket so that the rotation bracket is elastically supported towards the stopper portion.

The rotation bracket may have the fixing post integrated therewith.

In accordance with a further aspect of the present invention, there is provided a swing armrest for a seat, the swing armrest including a fixation bracket fixed to a seatback frame or fixed to a seatback bracket that is fixed to the seatback frame, a rotation bracket rotatably fixed to the fixation bracket by a rotation pin, a return spring installed to elastically support the rotation bracket in a direction in which the rotation bracket rotates with respect to the fixation bracket, a fixing post protruding from the rotation bracket to a side of the seat, and an armrest coupled to the fixing post.

The fixation bracket may include two rotation support portions configured to support opposite ends of the rotation pin, respectively, and a stopper portion having a shape interconnecting the two rotation support portions in a state in which the fixing post protrudes from a space between the two rotation support portions so as to restrict a front side of the rotation bracket from rotating outwardly of the seat.

The fixation bracket may further include two fixed support portions each extending from a corresponding one of the two rotation support portions and fixed to the seatback frame, and a stopper fixing portion extending from the stopper portion and fixed to the seatback frame.

The return spring may be installed between the fixation bracket and the rotation bracket so that the rotation bracket is elastically supported towards the stopper portion.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF ILLUSTRATIVE EMBODIMENTS

Figure 1:
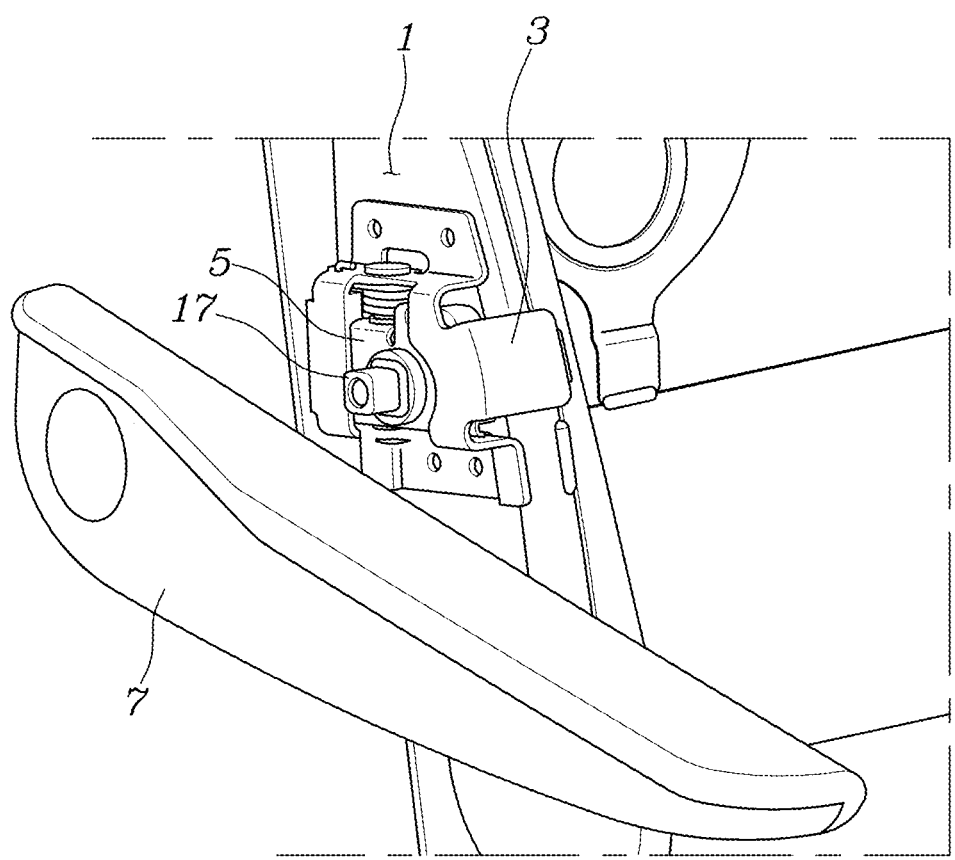
FIG. 1 is a view illustrating a swing armrest of a seat according to the present invention.
Figure 2:
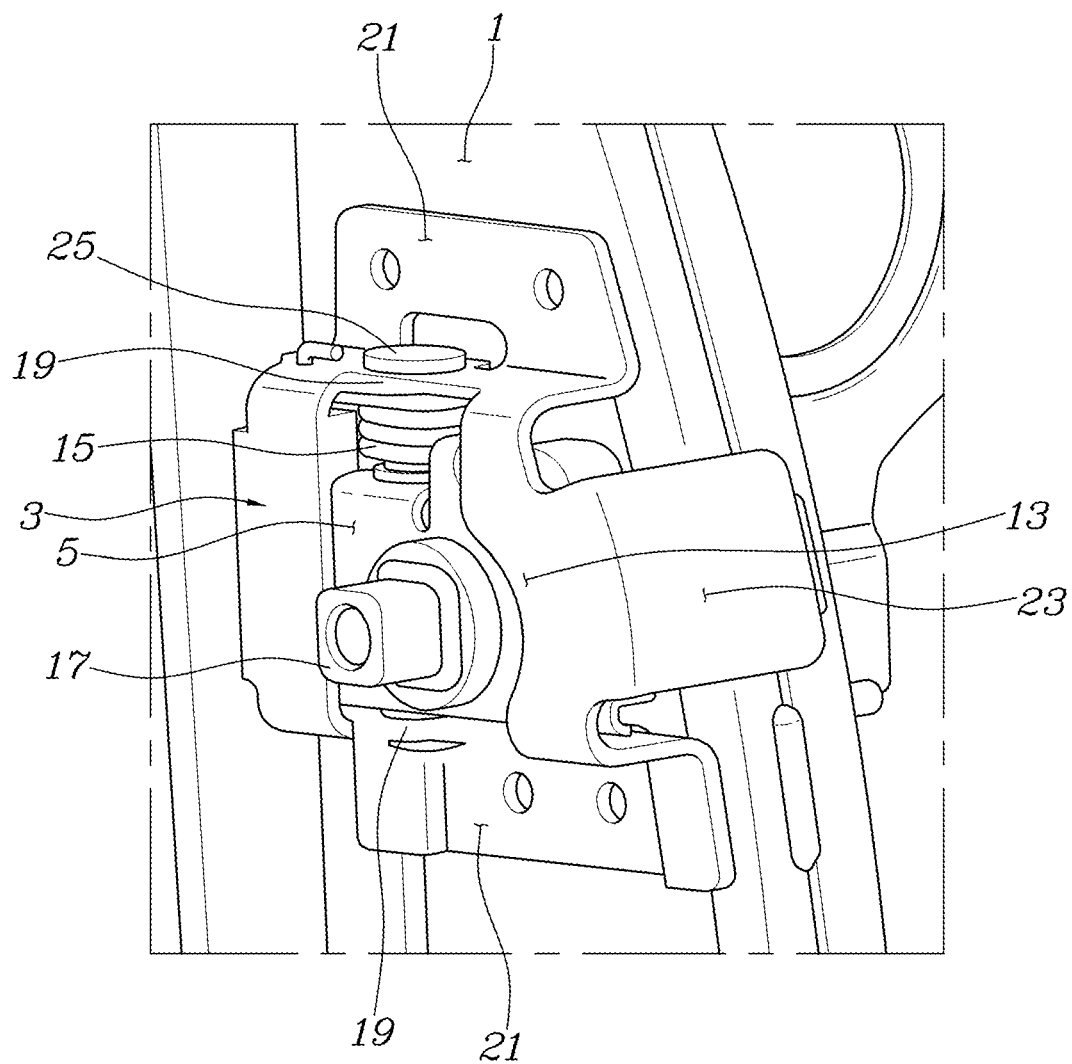
FIG. 2 is a detailed view illustrating a main portion of FIG. 1.
Figure 3:
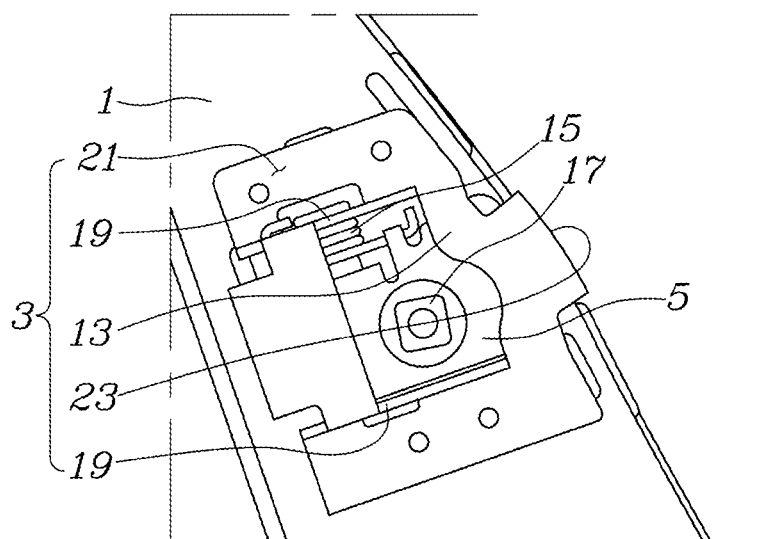
FIG. 3 is a view illustrating a comparison between a standard position of the armrest and a state after the armrest is swung, as the portion illustrated in FIG. 2 is viewed from a side of the seat.
Figure 3:
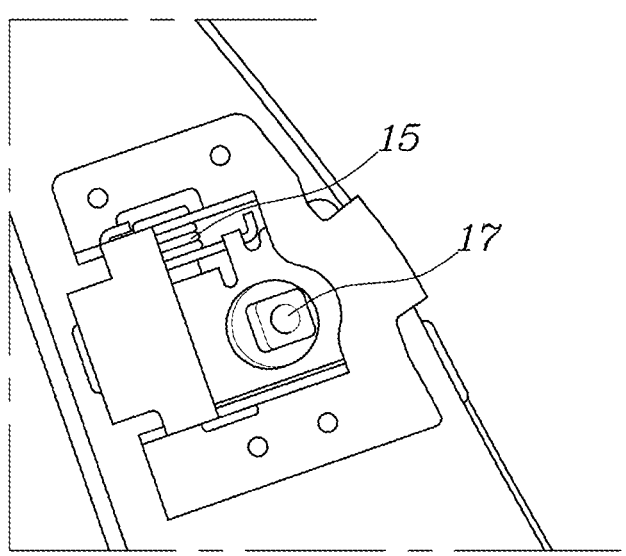
Figure 4:
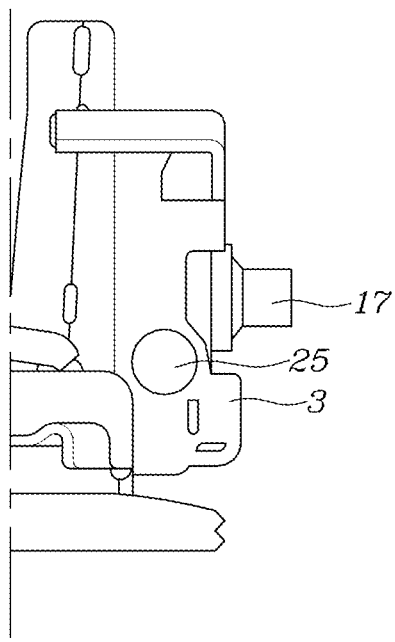
FIG. 4 is a view illustrating a comparison between a standard position of the armrest and a state after the armrest is swung, as the portion illustrated in FIG. 2 is observed from above the seat.
Figure 4:
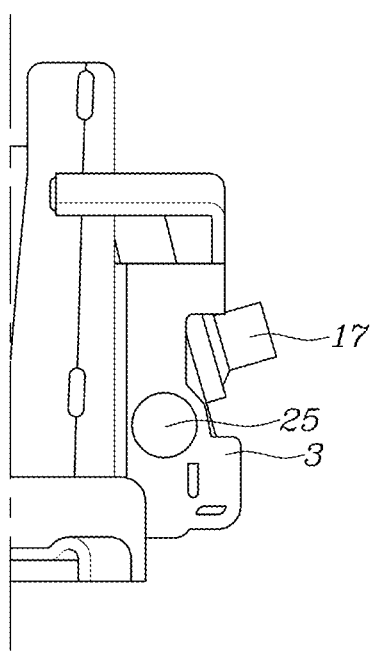

Hereinafter, embodiments of the present invention will be described in detail with reference to the accompanying drawings, the same reference numerals are used to designate the same/like components, and a redundant description thereof will be omitted.

In general, suffixes such as "module" and "unit" may be used to refer to elements or components. Use of such a suffix herein is merely intended to facilitate description of the specification, and the suffix itself is not intended to have any special meaning or function.

In describing the present disclosure, if a detailed explanation of a related known function or construction is considered to unnecessarily obscure the gist of the present disclosure, such explanation has been omitted but would be understood by those skilled in the art. The accompanying drawings are used only to help easily explain the technical idea of the present invention, and it should be understood that the idea of the present invention is not limited by the accompanying drawings. The idea of the present invention should be construed to encompass any alterations, equivalents and substitutes beyond what is shown in the accompanying drawings.

It will be understood that, although the terms first, second, etc. may be used herein to describe various elements, these elements should not be limited by these terms. These terms are generally only used to distinguish one element from another.

It will be understood that, when an element is referred to as being "connected to" another element, the element can be directly connected to the other element or intervening elements may also be present. In contrast, when an element is referred to as being "directly connected to" another element, there are no intervening elements present.

A singular representation may include a plural representation unless it represents a definitely different meaning from the context.

Terms such as "include" or "has" used herein should be understood that they are intended to indicate the existence of several elements, functions or steps, disclosed in the specification, and it is also understood that greater or fewer elements, functions, or steps may likewise be utilized.

Referring to FIGS. 1 to 5, an embodiment of a swing armrest for a seat of the present invention includes a fixation bracket 3 fixed to a seatback frame 1, a rotation bracket 5 rotatably installed on the fixation bracket 3, and an armrest 7 fixed to the rotation bracket 5.

The rotation bracket 5 is rotatably installed on the fixation bracket 3 by a vertical rotation shaft.

Figure 5:
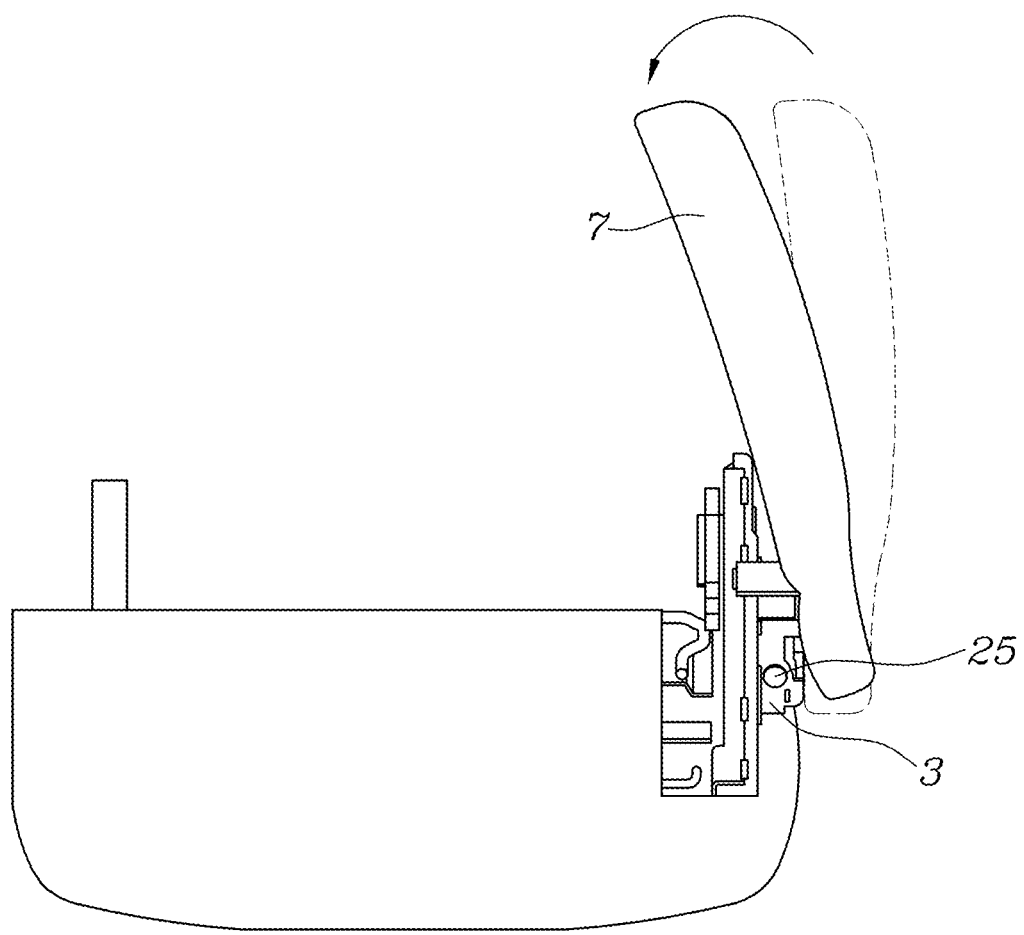
FIG. 5 is a view illustrating the change in FIG. 4 as the seat is observed from above in a state in which the armrest is mounted to the seat.

The armrest 7 of the present invention is configured such that, when the armrest 7 receives pressure from a side, the rotation bracket 5 rotates with respect to the fixation bracket 3, allowing the armrest 7 to rotate inwardly of a seat 9, as illustrated in FIG. 5. With this configuration, even if a passenger's arm is caught between a door 11 and the armrest 7 when the door 11 is closed, the armrest 7 rotates inwardly of the seat 9 to secure a space so that the arm is not injured.

For reference, the fixation bracket 3 may be directly fixed to the seatback frame 1 as described above, or may be fixed to a separate seatback bracket (not shown) fixed to the seatback frame 1.

The fixation bracket 3 is provided with a stopper portion 13 configured to limit rotation of a front side of the rotation bracket 5, and the fixation bracket 3 and the rotation bracket 5 are provided therebetween with a return spring 15 configured to elastically support the rotation bracket 5 towards the stopper portion 13.

With this configuration, under a normal situation, the armrest 7 maintains a standard position in which nothing is caught between the armrest 7 and the door 11, and the rotation bracket 5 is in close contact with the stopper portion 13 by the return spring 15.

Of course, when a passenger's arm or the like is caught between the door 11 and the armrest 7 and pressing force is transmitted to the armrest 7, the rotation bracket 5 rotates while elastically deforming the return spring 15 so as to implement a state "after the armrest is swung" in which the armrest 7 is rotated inwardly of the seat 9.

The rotation bracket 5 is provided with a fixing post 17 configured to fix the armrest 7, and the armrest 7 is coupled to the fixing post 17.

The fixing post 17 has a shape protruding from the rotation bracket 5, passing through the fixation bracket 3, and towards a side of the seat 9.

Accordingly, the armrest 7 is fixed to the fixing post 17 protruding laterally from the rotation bracket 5 and the fixation bracket 3, and has a predetermined distance from the fixation bracket 3. Therefore, when the armrest 7 is rotated from the standard position to the state "after the armrest is swung" as described above, the armrest 7 may be smoothly rotated without interference with the fixation bracket 3.

The fixation bracket 3 includes two rotation support portions 19 configured to rotatably support the rotation bracket 5 at opposite sides of the rotation bracket 5, respectively, two fixed support portions 21 configured to fix the two rotation support portions 19 to the seatback frame 1, respectively, and the stopper portion 13 configured to restrict rotation of the rotation bracket 5 while interconnecting the two rotation support portions 19.

Accordingly, the two rotation support portions 19 configured to support the rotation bracket 5 are firmly supported on the seatback frame 1 by the two fixed support portions 21, allowing the rotation bracket 5 to rotate smoothly and stably to thereby secure robust durability.

The fixation bracket 3 may further include a stopper fixing portion 23 extending from the stopper portion 13 and fixed to the seatback frame 1.

Accordingly, the stopper portion 13 is firmly supported by the stopper fixing portion 23 and is not easily deformed, so that the range within which the rotation bracket 5 can be rotated with respect to the seatback frame 1 is stable and solid. Therefore, the standard position of the armrest 7 does not easily change and maintains a constant state, thereby greatly improving the durability of the seat 9 and the armrest 7.

The present invention described above may also be described as follows.

An embodiment of a swing armrest for a seat of the present invention includes a fixation bracket 3 fixed to a seatback frame 1, a rotation bracket 5 rotatably fixed to the fixation bracket 3 by a rotation pin 25, a return spring 15 installed to elastically support the rotation bracket 5 in a direction in which the rotation bracket 5 rotates with respect to the fixation bracket 3, a fixing post 17 protruding from the rotation bracket 5 to a side of the seat 9, and an armrest 7 coupled to the fixing post 17.

The fixation bracket 3 includes two rotation support portions 19 configured to support opposite ends of the rotation pin 25, respectively, and a stopper portion 13 having a shape interconnecting the two rotation support portions 19 in a state in which the fixing post 17 protrudes from a space between the two rotation support portions 19 so as to restrict a front side of the rotation bracket 5 from rotating outwardly of the seat 9.

The fixation bracket 3 further includes two fixed support portions 21 each extending from a corresponding one of the two rotation support portions 19 and fixed to the seatback frame 1, and a stopper fixing portion 23 extending from the stopper portion 13 and fixed to the seatback frame 1.

The return spring 15 is installed between the fixation bracket 3 and the rotation bracket 5 so that the rotation bracket 5 is elastically supported towards the stopper portion 13.

The fixing post 17 may be separately inserted and fixed to the rotation bracket 5, or may be integrated with the rotation bracket 5.

Figure 6:
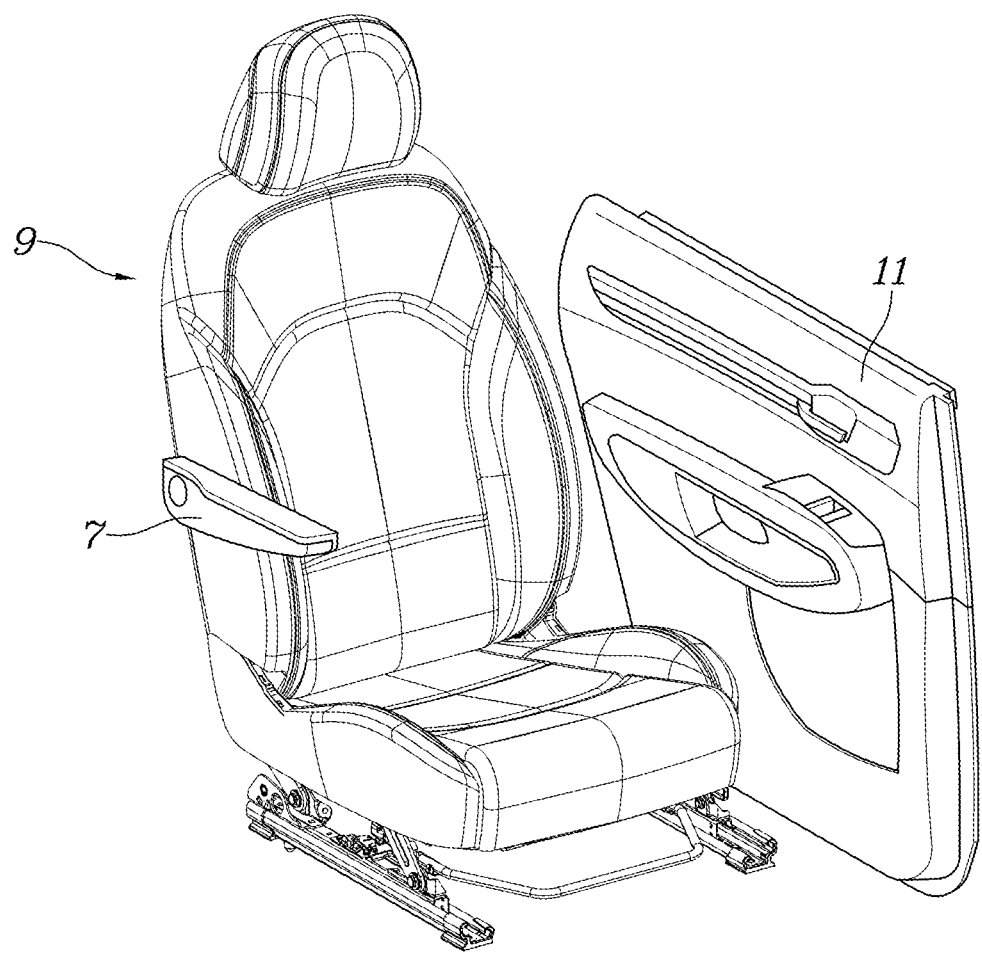
FIG. 6 is a view illustrating a state in which a swivel seat to which the present invention applied is mounted on a vehicle.
Figure 7:
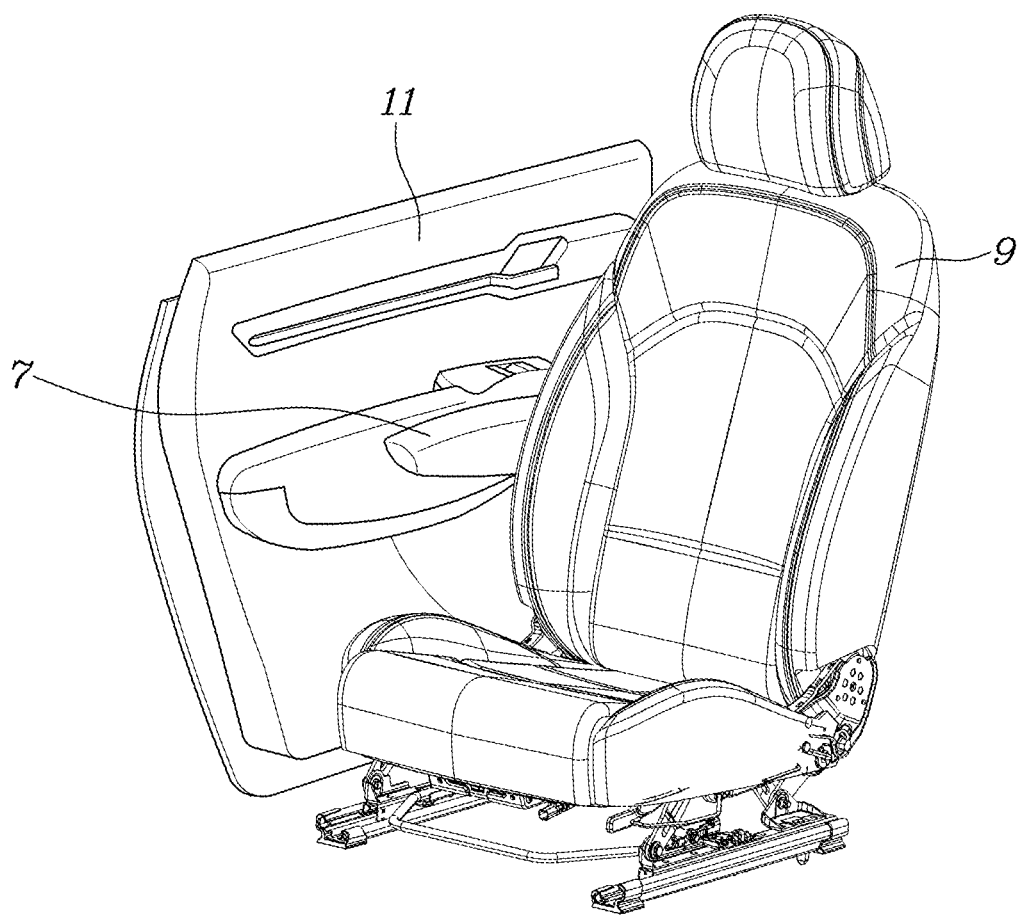
FIG. 7 is a view explaining a state in which the swivel seat of FIG. 6 is rotated and the armrest is disposed adjacent to a door.
Figure 8:
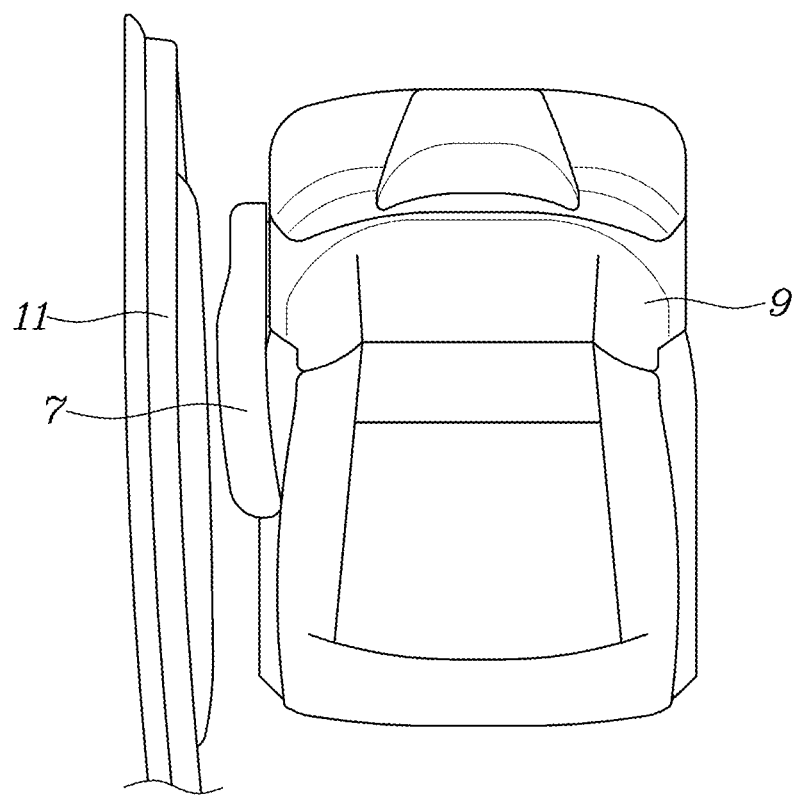
FIG. 8 is a view of the state of FIG. 7 observed from above the seat.
Figure 9:
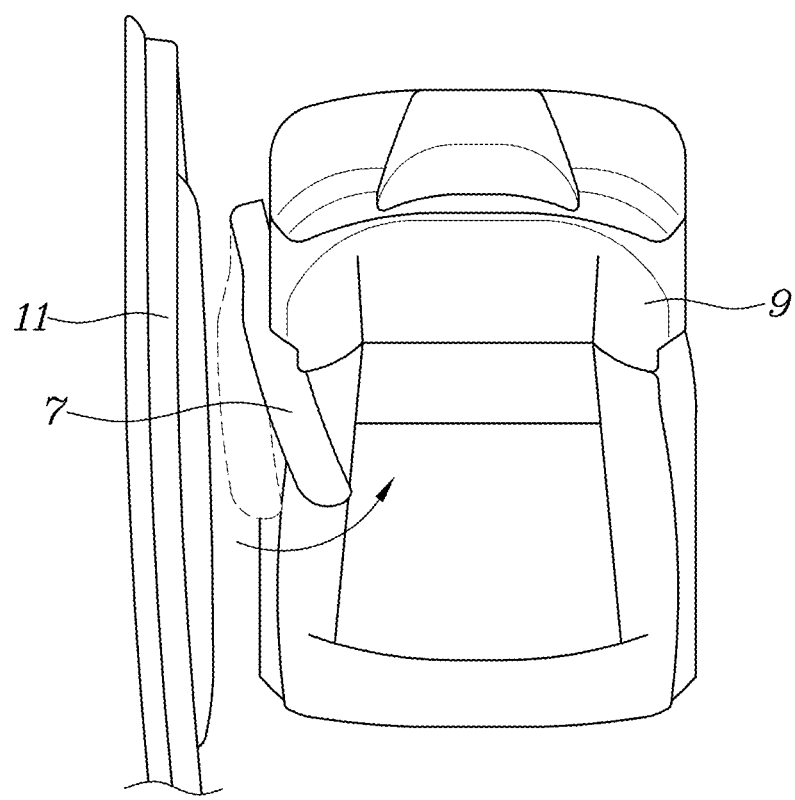
FIG. 9 is a view explaining that the armrest is rotated according to the present invention in the same state as in FIG. 8.

FIGS. 6 to 9 illustrate a swivel seat to which the present invention is applied as described above, and the seat 9 in FIG. 6 may be rotated as in FIG. 7.

Here, in the state illustrated in FIG. 6, there is no problem because the armrest 7 on the left side is far from the door 11, but after the seat 9 is rotated as in FIG. 7, the door 11 and the armrest 7 may have only a narrow gap therebetween, as illustrated in FIG. 8.

In the state illustrated in FIG. 8, when a passenger's arm is put on the outer side of the armrest 7 and the door 11 is opened and closed, the passenger's arm may be caught between the door 11 and the armrest 7 and be injured. However, because the present invention is applied to the armrest 7, in the above case, the armrest 7 rotates to secure a space between the door 11 and the armrest 7 as illustrated in FIG. 9, thereby preventing the passenger's arm from being injured.

As is apparent from the above description, the present invention provides a swing armrest for a seat, the armrest being capable of automatically securing a space between the armrest and a door when an object is caught therebetween. The armrest is applied to a swivel seat, etc., and when the door is closed while the swivel seat is rotated and a passenger's arm is caught between the door and the armrest, the armrest secures a space between the door and the armrest so as to prevent injury to the passenger, thereby greatly improving safety and marketability of a vehicle.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A swing armrest for a seat, the swing armrest comprising:
   a fixation bracket fixed to a seatback frame or fixed to a seatback bracket that is fixed to the seatback frame;
   a rotation bracket rotatably installed on the fixation bracket; and
   an armrest fixed to the rotation bracket,
   wherein the fixation bracket comprises:
      two rotation support portions configured to rotatably support the rotation bracket at opposite sides of the rotation bracket, respectively,
      two fixed support portions configured to fix the two rotation support portions to the seatback frame, respectively,
      a stopper portion being rigidly fixed relative to the two rotation support portions and having a bridge shape that interconnects the two rotation support portions, the stopper portion being configured to restrict rotation of the rotation bracket; and
      a stopper fixing portion extending from the stopper portion in a circumferential direction of rotation of the rotation bracket and fixed to the seatback frame, and
   wherein the stopper fixing portion, together with the two rotation support portions, the two fixed support portions, and the stopper portion, forms a space that rotatably accommodates the rotation bracket.

2. The swing armrest according to claim 1, wherein the rotation bracket is rotatably installed on the fixation bracket by a vertical rotation shaft.

3. The swing armrest according to claim 2, wherein the stopper portion is configured to restrict rotation of a front side of the rotation bracket, and wherein a return spring configured to elastically support the rotation bracket towards the stopper portion is provided between the fixation bracket and the rotation bracket.

4. The swing armrest according to claim 1, wherein the rotation bracket includes a fixing post configured to fix the armrest, and the armrest is coupled to the fixing post.

5. The swing armrest according to claim 4, wherein the fixing post has a shape protruding from the rotation bracket, passing through the fixation bracket, and towards a side of the seat.

6. A swing armrest for a seat, the swing armrest comprising:
   a fixation bracket fixed to a seatback frame or fixed to a seatback bracket that is fixed to the seatback frame;

a rotation bracket rotatably fixed to the fixation bracket by a rotation pin;

a return spring configured to elastically support the rotation bracket in a direction in which the rotation bracket rotates with respect to the fixation bracket;

a fixing post protruding from the rotation bracket to a side of the seat; and an armrest coupled to the fixing post, wherein the fixation bracket comprises:

two rotation support portions configured to support opposite ends of the rotation pin, respectively, a stopper portion being rigidly fixed relative to the two rotation support portions and having a bridge shape interconnecting the two rotation support portions in a state in which the fixing post protrudes from a space between the two rotation support portions so as to restrict lateral outward rotation of the rotation bracket away from a seating area of the seat, two fixed support portions each extending from a corresponding one of the two rotation support portions and fixed to the seatback frame, and a stopper fixing portion extending from the bridge-shaped stopper portion in a circumferential direction of rotation of the rotation bracket and fixed to the seatback frame, and wherein the stopper fixing portion, together with the two rotation support portions, the two fixed support portions, and the stopper portion, forms a cage-shaped space that rotatably accommodates the rotation bracket.

7. The swing armrest according to claim 6, wherein the return spring is between the fixation bracket and the rotation bracket so that the rotation bracket is elastically supported towards the stopper portion.

8. The swing armrest according to claim 6, wherein the rotation bracket has the fixing post integrated therewith.

9. The swing armrest according to claim 6, wherein the fixing post has a shape protruding from the rotation bracket, passing through the fixation bracket, and towards the side of the seat.

10. A seat comprising:

a fixation bracket fixed to a seatback frame or fixed to a seatback bracket that is fixed to the seatback frame;

a rotation bracket rotatably fixed to the fixation bracket by a rotation pin;

a return spring configured to elastically support the rotation bracket in a direction in which the rotation bracket rotates with respect to the fixation bracket;

a fixing post protruding from the rotation bracket to a side of the seat; and an armrest coupled to the fixing post, wherein the fixation bracket comprises:

two rotation support portions configured to support opposite ends of the rotation pin, respectively, a stopper portion being rigidly fixed relative to the two rotation support portions and having a bridge shape interconnecting the two rotation support portions in a state in which the fixing post protrudes from a space between the two rotation support portions so as to restrict lateral outward rotation of the rotation bracket away from a seating area of the seat, two fixed support portions each extending from a corresponding one of the two rotation support portions and fixed to the seatback frame, and a stopper fixing portion extending from the bridge-shaped stopper portion in a circumferential direction of rotation of the rotation bracket and fixed to the seatback frame, and wherein the stopper fixing portion, together with the two rotation support portions, the two fixed support portions, and the stopper portion, forms a cage-shaped space that rotatably accommodates the rotation bracket.

11. The seat according to claim 10, wherein the return spring is between the fixation bracket and the rotation bracket so that the rotation bracket is elastically supported towards the stopper portion.

12. The seat according to claim 10, wherein the fixing post has a shape protruding from the rotation bracket, passing through the fixation bracket, and towards the side of the seat.

* * * * *